(12) United States Patent
Davenport

(10) Patent No.: US 6,828,958 B2
(45) Date of Patent: Dec. 7, 2004

(54) ERGONOMIC SIDE GRIP COMPUTER MOUSE

(76) Inventor: Anthony G. Davenport, 2532 Benvenue Ave., Berkeley, CA (US) 94704

( * ) Notice: Subject to any disclaimer, the term of this patent is extended or adjusted under 35 U.S.C. 154(b) by 331 days.

(21) Appl. No.: 09/916,727

(22) Filed: Jul. 26, 2001

(65) Prior Publication Data

US 2003/0197680 A1 Oct. 23, 2003

Related U.S. Application Data

(63) Continuation-in-part of application No. 09/756,024, filed on Jan. 8, 2001.
(60) Provisional application No. 60/182,150, filed on Feb. 14, 2000.

(51) Int. Cl.⁷ .............................................. G09G 5/08
(52) U.S. Cl. ....................................................... 345/163
(58) Field of Search ................................ 345/163–166; D14/402–412; 463/37

(56) References Cited

U.S. PATENT DOCUMENTS

| | | | |
|---|---|---|---|
| D369,154 S | 4/1996 | Powell | |
| D376,140 S | * 12/1996 | Schultz | D14/405 |
| D376,790 S | * 12/1996 | Goulet et al. | D14/408 |
| 5,648,798 A | 7/1997 | Hamling | |
| 5,659,335 A | * 8/1997 | Partridge, III | 345/157 |
| 5,841,425 A | 11/1998 | Zenz | |
| 6,323,842 B1 | * 11/2001 | Krukovsky | 345/163 |
| 6,396,479 B2 | * 5/2002 | Gordon | 345/163 |

FOREIGN PATENT DOCUMENTS

| | | | | |
|---|---|---|---|---|
| JP | 62-269222 | * 11/1987 | | G06F/3/033 |
| JP | 01-103723 | * 4/1989 | | G06F/3/033 |
| JP | 04-018627 | * 1/1992 | | G06F/3/033 |
| JP | 07-306750 | * 11/1995 | | G06F/3/033 |
| JP | 08-147102 | * 6/1996 | | G06F/3/033 |

* cited by examiner

Primary Examiner—Alexander Eisen
(74) Attorney, Agent, or Firm—Howard Cohen

(57) ABSTRACT

An ergonomic side grip computer mouse includes a base; a side wall coupled to the base, the side wall having a substantially circular configuration; switch means coupled to the side wall for receiving user inputs from at least one of the fingers of the computer user and generating switch signals; and, mouse tracking means coupled to the base for generating mouse movement signals.

4 Claims, 7 Drawing Sheets

ERGONOMIC SIDE GRIP COMPUTER MOUSE

CROSS REFERENCE TO RELATED APPLICATIONS

The present patent application is a continuation-in-part of prior co-pending U.S. patent application Ser. No. 09/756,024 filed Jan. 8, 2001, titled "Ergonomic Fingertip Computer Mouse", which in turn claims priority based on U.S. provisional patent application serial No. 60/182,150 filed Feb. 14, 2000.

BACKGROUND OF INVENTION

1. Field of the Invention

This invention relates generally to the field of computer peripherals, specifically to a mouse.

2. Prior Art

The desktop computer mouse was born in the 1970s as a computer interface device, a box of switches to be pushed around the desktop as a minor adjunct to the keyboard. It would have been difficult then to predict how many people would come to use the mouse a generation later, how much they would come to use it, and how its growing use would become associated with repetitive stress injury (RSI). In the workplace, mouse utilization has increased at the application level at the same time that mouse driven programs themselves have expanded in use. U.S. Pat. No. 5,648,798 indicates that research directed by Peter W. Johnson of University of California Berkeley/San Francisco Ergonomics Lab indicates that mouse usage occupies one to two-thirds of one's working time on a computer.

In addition, the computer mouse may be utilized for added hours each day by users in ways unforeseen in the 70's associated with internet browsing and chatting, computer creativity tools and computer gaming which currently is the fastest growing market in the US economy.

The mouse has been utilized as a motion and directional input device for computer games with 3d environments since the mid 1980s.

The mouse implementation that makes these 3d gaming environments navigable is called Mouselook. This is described in the instructions to the popular game Quake 3: "For the most part, you'll look around simply by moving the mouse to and fro. Imagine that your mouse is controlling the gladiators head and you'll quickly get the hang of it. Remember that you will shoot whatever you are looking at."

Just as the driver of a car can look around and up and down without needing to turn the car, the mouselook function allows the gamer to "look around" the game while moving independently. Agility or speed in looking around is an advantage.

The need to turn the mouse quickly in 3d environment-based games requires the physical means to easily turn or rotate the mouse. However, with the conventional handheld mouse, the relatively coarse control of the deltoid muscle group that rotates the elbow to achieve this makes it an ergonomically difficult task. Additionally the ergonomic assumptions of prior art design goals, (i.e. "relaxed position" and "position of repose") don't address the stress ergonomics that arise in gaming mouse use sessions where the mouse is in constant and continuous motion.

Unfortunately, since the 1970's computer mouse use has been clinically related to RSI (Repetitive Stress Injury). Hand-held mice are actually moved by the arm, which proves to be injurious. A review of diagnostic literature show irrefutably that the joints and muscular system of the shoulder, elbow, forearm and wrist operate under stress and are prone to injury when used to accomplish repetitive mouse movement. Whether the mouse use is in game play or is work related, the risk of Carpal Tunnel Syndrome, the most serious of the RSI injuries, rises with prolonged use. This wrist injury is the number one cause of industrial lost time in the US and is estimated to result in over $20 billion in lost wages to workers in 2001. The correctional operation, which typically requires 6 months for full recovery, has become the most commonly preformed industrial related operation in the US.

The current invention, a "second generation" mouse features a small, light shape that fits an ergonomically positive hand posture to provide increased control for the speed and movement requirements of 3d computer gaming and other computer operations while requiring less than half the movement of a conventional desktop mouse.

The invention makes use of the hand musculature/cortex area that is minimally utilized or exercised in devices of prior art design. The human hand's most dexterous and sensitive control architecture is the thumb and opposable finger group. The feedback transmitted tactilely through the object grasped between the thumb and fingers allows sophisticated motion control in that the object may be moved simultaneously in different directions by either digit. The high degree of control that is obtained from this tactile feedback loop makes possible the surgeon's scalpel, the scientist's dial, and the violinist's bow. It is appropriate, in light of the current ergonomic shortcomings to regard mouse control as a similarly challenging operation that should maximally utilize and conserve the hand's strength and dexterity.

SUMMARY AND OBJECTS OF THE INVENTION

One object of the present invention is to provide a desktop mouse consisting of a sensitive motion encoder housed in a small form sized and shaped to be held and controlled by the thumb and opposable fingers, and thus obtain superior rotation and motion control specifically useful in 3d environment gaming for functions such as mouselook, as well as on the desktop for conventional computer operations, such performance requiring less than half the motion of many devices of the prior art.

It is also an object of this invention to provide a device that allows the user a comfortable, sustainable posture that is free of the injurious flexing stresses associated with CTS. Therefor, the structure is designed to allow a semi-pronated handwriting posture that allows the heel of the hand and little finger to remain aligned and motionless on the desktop, with no compression of the wrist or requirement for flexing of the wrist or hand. A primary design objective of this invention is to reduce carpal tunnel activity and stress over devices of the prior art by A) requiring less than half the motion B) shifting the movement task to the better suited thumb and hand muscles, which only need to move the two digits grasping the device, (only the finger of which requires carpal tunnel activity,) and C) the integral ergonomic efficiency of the "pushing redundancy" of the two point grasp, in that only one digit or motive point at a time may need to exert movement force.

DETAILED DESCRIPTION OF THE PREFERRED EMBODIMENTS

Figure 1:
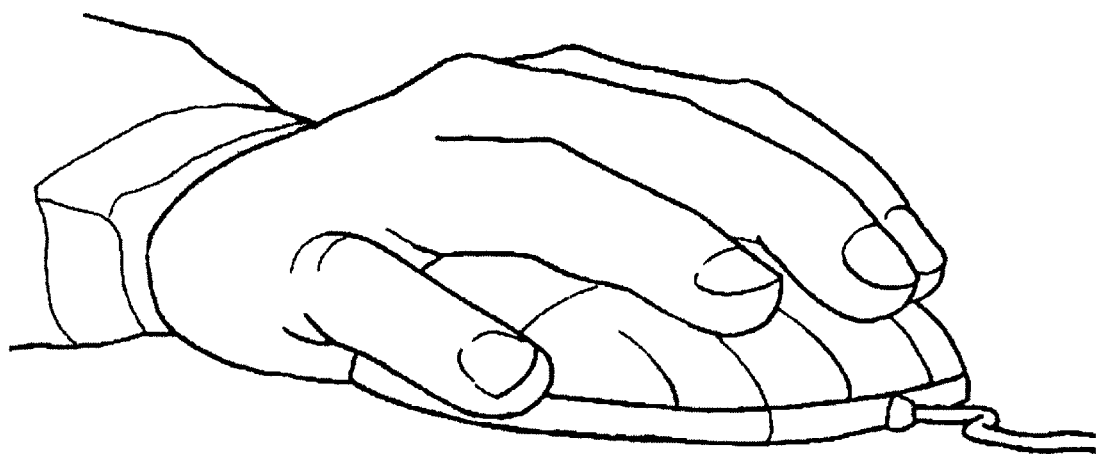
FIG. 1 is a perspective view of a typical prior art computer mouse.

FIG. 1 shows one type of conventional mouse. It should be noted that in this conventional mouse all of the user's fingers are on top of the mouse and supported by it. Also, the palm of the user's hand is supported by the mouse.

With reference now to FIGS. 2–12, the presently preferred embodiments of the side grip mouse will be discussed in detail.

Figure 2:
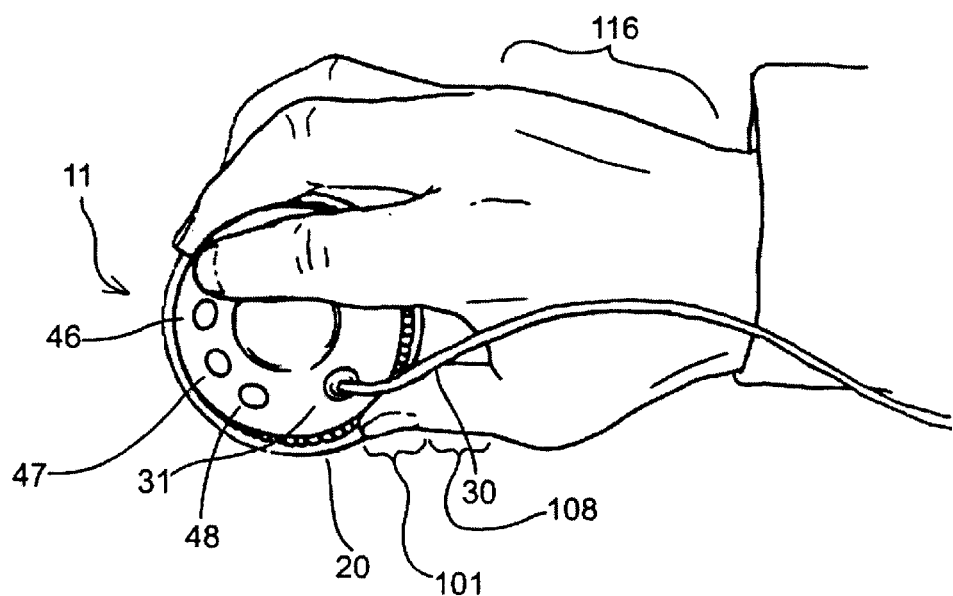
FIG. 2 is a top view showing the computer mouse of the present invention wielded by the user.
Figure 3:
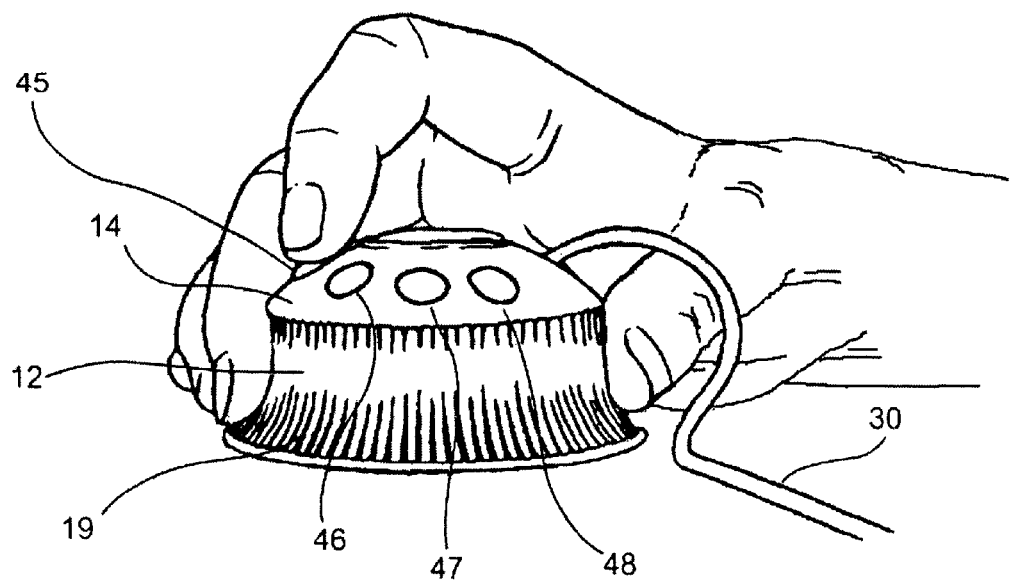
FIG. 3 is a perspective elevation showing the computer mouse of FIG. 2, grasped by the user.
Figure 4:
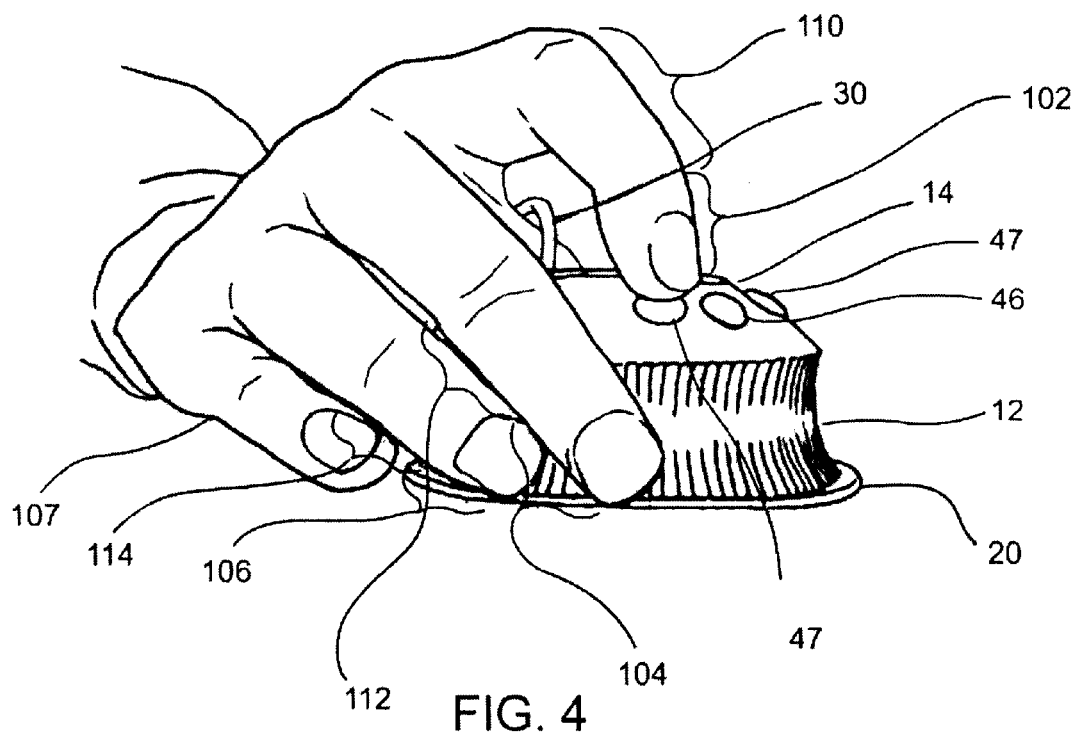
FIG. 4 is a perspective elevation showing the computer mouse grasped by the user.

FIGS. 2–4 show perspective views of the typical posture of a right handed user operating the present mouse. In order that the side grip mouse be easily grasped between the thumb and opposable fingers, a housing structure is provided comprising a circular, substantially vertical side wall 12 extending upwardly from a circular base 20. The circumference of the vertical side wall 12 is wrapped with a rubber tactile grip 19. A top panel 14 extends across the top of the side wall 12. The top panel 14 is substantially horizontal and has a slightly convex domed shape for structural strength.

The mouse has four buttons 45, 46, 47 and 48 in the top panel 14 for operation by the user's fingers. A cord 30 enters the mouse through a mouse cord opening 31, and the cord is connected to a computer, not shown, to convey electrical signals between the mouse and the computer.

It is important to recognize that the mouse 11 is sized and shaped so that during normal operation only the tip of the thumb and only the tips of three of the fingers contact the mouse. More specifically, the side wall is sized and shaped to receive the distal phalanx (i.e. tip) 101 of the thumb and the distal phalanx of one or two of the fingers, and the side wall is sized and shaped so that the proximal phalanx of the thumb and the proximal phalanx of other fingers do not normally contact the side wall. As shown in FIGS. 2–4 the distal phalanx of the index finger 102 contacts the button 47, the distal phalanx of the middle finger 104 contacts the side wall 12, and the distal phalanx of the ring finger 106 contacts the side wall 12, and the little finger 107 and the heel of the hand rest on the desk top or whatever horizontal, stationary surface the mouse rests on, which is not shown. Furthermore, the proximal phalanx of the thumb 108, the medial phalanx of the index finger 110, the medial phalanx of the middle finger 112, and the medial phalanx of the ring finger 114 do not contact the side wall 12. It should also be noted that the metacarpal zone of the thumb, the metacarpal zones of the fingers and the palm of the hand all do not contact the mouse.

It can thus be seen that the user normally operates the mouse by gripping the side wall 12 with the fingertips and the tip of the thumb; resting the side of the little finger and the blade of the hand on a fixed surface; and moving the mouse on the fixed surface by flexing the fingers and the thumb without moving the blade of the hand 116 and the little finger 107 against the fixed surface.

Figure 6:
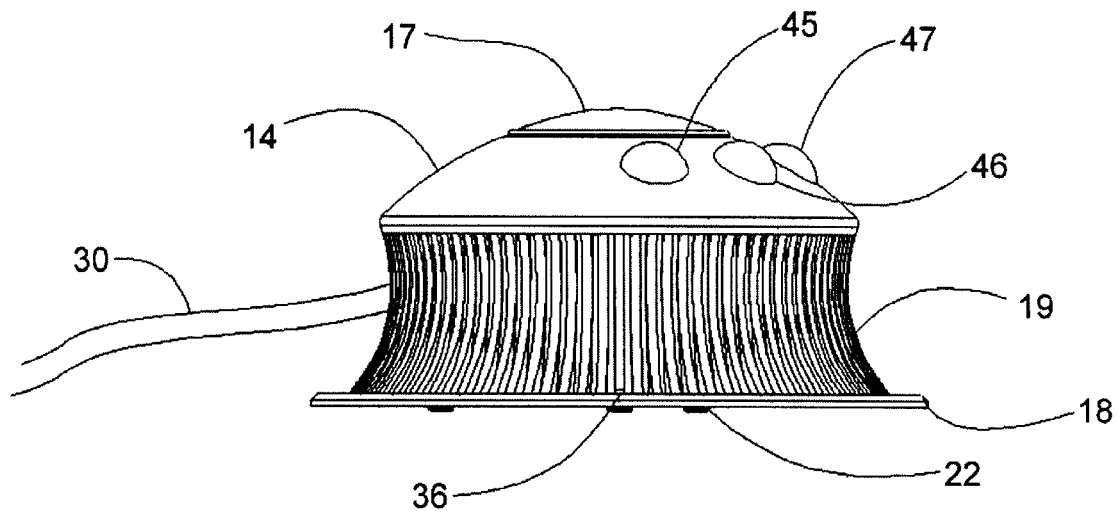
FIG. 6 is an elevation view of the computer mouse.

In the present preferred embodiment, the side wall 12 is substantially vertical with a concave profile, when viewed in elevation, e.g. FIG. 6. The diameter of the side wall is approximately 5–6 cm to accommodate the average human hand. The side wall 12 is approximately 2 cm tall, slightly greater than the width of the average human thumb, this being the widest of the grasping digits, and the concavity of the side wall provides the optimal shape to fit the rounded digit tips. The vertical grasping side wall requires that the hand be postured such that the thumb and opposite grasping digit are positioned so that the digit and thumb are flexed in the horizontal plane to move the mouse. As best illustrated in FIG. 3, this hand position requires an approximate 60 degree pronation of the forearm, a posture referred to in the diagnostic literature as "handwriting posture" and advocated as a safe working posture which elevates the carpal tunnel and prevents compression thereof on the desktop, a problem associated with devices of the prior art. The hand rests upon the desktop rather than upon the mouse structure, and obtains continuous support along the lateral side (the "blade" of the hand) from the heel to the tip of the little finger. This posture allows the little finger to contact the desktop as needed to provide a stabile anchor or reference for movement of the mouse. The little finger "brace" so afforded greatly facilitates cursor positioning tasks that require precise control. In all operations, the heel of the hand may remain relaxed and motionless, eliminating any need for shoulder or elbow movement.

The goal of reducing the ergo, or work required to move the mouse and perform cursor movement tasks, is further accomplished in the present preferred embodiment by minimizing both the weight of the mouse, and the friction of the structure on the desktop. The weight of the preferred embodiment of the side grip mouse is between 65–80 grams, well within the exercise range of the musculature of the control digits. Our testing shows that this weight can be used comfortably over extended sessions by most users. This is about ½ the weight of many prior art mice The low weight, size, and height of the side grip mouse (approximately 2 cm) contribute to the stability and ease of movement of the structure.

Turning now to FIGS. 6–9, it should be understood that friction on the desktop is reduced by providing a plurality of glide pads 22 extending downwards from the base 13, the glide pads 22 having a minimal height to raise the base 13 from contact with the desktop or other mouse-supporting surface. The glide pads 22 may be integrally formed with the base 13 or may comprise separate pads of low friction material, such as PTFE, Delrin®, or the like, secured to the lower surface of the base. Although four such glide pads 22 are shown, a larger or smaller number may be used.

Another ergonomic factor that must be overcome in devices of the prior art is the drag that is induced by the mouse cord as it is pulled or pushed about the desktop as attached to the mouse. The present invention features a mouse cord 30 which includes a distal end connected to an appropriate port of a computer system, not shown, and a proximal end that extends through an opening 31 in the top panel 14 to a conventional circuit board 40. This top mounting arrangement causes the cord to be directed upwardly as it extends from the top panel 14, so that the cord 30 describes a semi-loop above the mouse-supporting surface and may comfortably rest along the back of the hand along the 'Y" of the thumb and fingers (FIG. 2). In all usage, the loop establishes a slack portion of the cord that creates no drag and effectively eliminates this resistance. Thus the force required to move the mouse laterally is minimized.

In the present preferred embodiment, the shape of the housing structure and side wall 12 is circular. The optimal shape to allow the side grip mouse to be rocked or smoothly rotated between the grasping digits is circular. This optimal shape aspect of the side grip mouse housing and side wall 12 relates specifically to the contact zone about the circumference of the structure that receives the user's fingers and thumb. This contact zone comprises all but the very front and rear of the side wall 12. In an alternate embodiment, the mouse 11 may be shaped such that the contact zones (the sides of the mouse) are substantially circular, when viewed in plan, and the forward and rear non-contact zones of the mouse 11 may depart from a strictly circular shape provided that the overall structure and side wall so formed does not hinder the rotatability of the mouse afforded by the circular grasping area of the structure and side wall. In an alternate embodiment, the housing and side wall could be of an oval or teardrop shape provided that the non circular portion of the shape was at the non contacted front or rear of the housing.

The side wall 12, which may be made of any appropriate material such as molded plastic, known to those familiar with the art, is fitted with a soft, tactilely responsive grip sleeve 19. The annular grip 19 is received about the, outer surface of the side wall 12, and is formed from a resilient, tactile material such as silicone rubber having a plurality of vertical ridges 21 arrayed thereabout to provide friction for rotation and grasp. In the present embodiment the side wall 12 and grip sleeve 19 together form the vertical concave grasping surface. However, the vertical side wall structure 12 may have the grip portion integrally formed therewith.

A thin (2 mm) base skirt 18 is annular in shape and continues the bottom plane of the mouse radially outwardly to a maximum diameter of 80–85 mm, prevents the fingertips from contacting and inducing friction on the desktop or operating surface, and the weight of the fingertips on the skirt 18 steadies and facilitates the operation of the mouse. In the present embodiment, the skirt is constructed of transparent molded plastic which allows brightly colored icons 37 embossed on the bottom side to be visible from the top.

A primary function of the present mouse, as with any mouse, is to enable the computer user to move and position a cursor on the computer screen. It is therefore important that it be immediately apparent to the user how movement of the mouse will be translated into movement of the cursor. For example, a user would normally expect that moving the mouse left and right on his desk would result in movement of the cursor left and right on the computer screen. With a conventional mouse which is asymmetrical in plan view it is apparent to the user how to hold the mouse to insure that the direction of mouse movement will translate into corresponding movement of the cursor, e.g. that left mouse movement will translate into left cursor movement. However, in contrast to the conventional mouse the present, circular mouse has no obvious natural orientation. Accordingly I have provided two indicators to enable the user to easily orient the mouse. Specifically, two raised tactile ridges 36 are formed on the top of the skirt 20 located 180 degrees from one another and in predetermined locations relative to the tracking mechanism 44, which is discussed below. Also, colored icons 37 are printed on the skirt 20 in the same locations as the tactile ridges. The user's finger tips contact the tactile ridges 36 when the grasp is properly centered, and the ridges are easily felt by the fingertips as a "home position" locating cue, to allow the grasp of the circular mouse to be properly positioned by feel alone.

An important feature of the present mouse is that it is easily rotatable by the finger tips. I have found that the optimal position of the user's finger tips for this is on what I call the "grasping centerline", which is on a diameter of the mouse and coincident with the tactile ridges.

In the preferred embodiment the skirt is also printed using silk-screening or other acceptable technology to produce bright visual icons 37 at the locations of the grasp centerline 42 tactile ridges 36. These icons are printed on the underside of the transparent skirt but may be produced in any manner such that they are easily visible to the user. In becoming accustomed to the mouse, the user may visually locate their grip using these locating icons, and by using the reference of the mouse cord which is in line with the thumb location on the right handed model, and the grasping finger for the left-handed model.

The preferred embodiment includes four mouse buttons 45, 46, 47 and 48 mounted on the top panel. The present embodiment is designed to accommodate and encourage "rest and relief" mouse-handling strategies as evaluated and recommended by occupational therapists over the last decade to reduce the incidence of repetitive injury syndrome (RIS). Therefor, a minimum of two top mounted buttons are required in order to fulfill the ergonomic design requirement of placing a button at every fingertip, since in the case where the mouse is grasped between the thumb and ring finger, both the index and middle finger may rest on the top panel.

The additional two buttons are supplied to provide usable buttons for an alternate grasp that the user may adopt as a strategy to avoid repetitive injury when fatigue occurs over extended use sessions. For instance, an alternate grasp such as that used with devices of the prior art (FIG. 1) may be employed when fatigue occurs, and in this case the 2 leftmost buttons could then be efficiently used. And, although most users choose to hold the mouse between the thumb and middle finger as illustrated in FIGS. 2–4, our experience finds that the mouse may be grasped between the thumb and either index, middle, or ring finger and that it is "switched" between the fingers easily. Since each finger is moved by independent muscles and tendons, the present mouse allows true ergonomic muscle group exchange and relief, a therapeutically recommended strategy to counter fatigue and prevent injury, not available with devices of the prior art without changing hands or devices.

Another important feature of the present mouse is that the right most button 45 is located adjacent the side wall 12. This encourages the user to adopt the posture shown in FIGS. 2–4 with the middle finger on the side wall and thus opposed to the thumb. In the preferred embodiment the right most button 45 is located about one centimeter from the edge of the side wall 12 which allows the user to rest his index finger on the button while keeping his middle finger comfortably close thereto on the side wall 12.

The mouse illustrated and described herein is for a right-handed user, and an alternate embodiment which would be a version specifically optimized for left handed users, would be identical to the illustrated version but a mirror image thereof. However, in the absence of a true left handed model, the "right handed" model is designed to be readily adapted and usable by left handed users after reassigning the leftmost buttons 47 and 48 to the primary mouse functions. Therefore the design includes a plurality of top mounted membrane switches situated as per left or right hand finger position. It is noted that this invention optimizes the fit and ergonomics for left handed users by providing a mirrored version with switches aligned to fit the left handed grasp.

Although any of the switches commonly used in like devices including conventional mechanical micro switches may be used effectively in the present invention, the preferred embodiment features both top panel and side grip switches or buttons of a membrane switch technology. The buttons and switches of this technology may be found in a wide variety of consumer devices and are well known to those practiced in the art. Membrane switches are actuated by grasp or squeeze, and do not need to be "tapped." There is no mechanical reset state to these switches as in the case of conventional mechanical mouse switches which makes them smoother and faster to "click" and "double click." Although they operate with no audible click, the switches are operated with a very subtle but distinct fingertip pressure that is natural, satisfying and easily learned.

Figure 7:
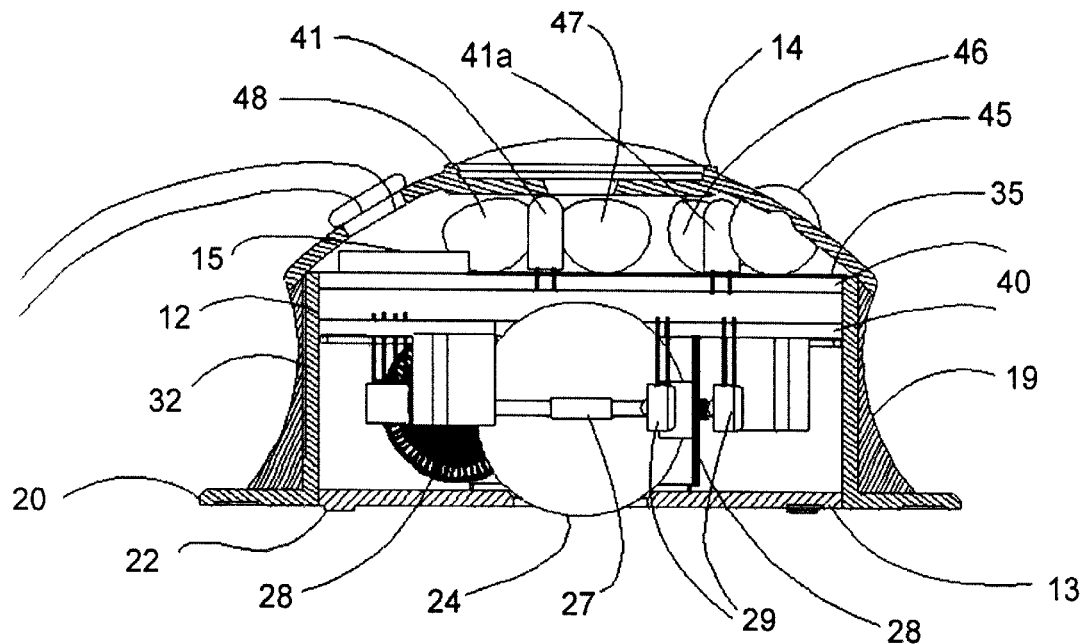
FIG. 7 is a cross-sectional elevation of the computer mouse taken along line 7—7 of FIG. 5.

As shown in FIG. 7, the present mouse provides switches 45–48 supported in the top panel 14. When the mouse is grasped with the thumb and middle finger, the natural curled position of the index finger will put it over mouse button 45. When the mouse is grasped between thumb and ring finger, buttons 45 and 46 are located respectively under the index and middle finger. The switches 45–48 comprise balls, a small portion of each of which protrudes through an opening in the top panel 14. A circuit board 40 is supported to extend laterally within the side wall 12, and a membrane switch 35 is secured on the circuit board 40 and positioned to support the switch balls 45–48. Manual pressure applied to the balls is transferred to the switch 35, which is actuated thereby. The circuit board 40 also provides support and electronic connections to the mouse tracking mechanism 23 described below.

Figure 5:
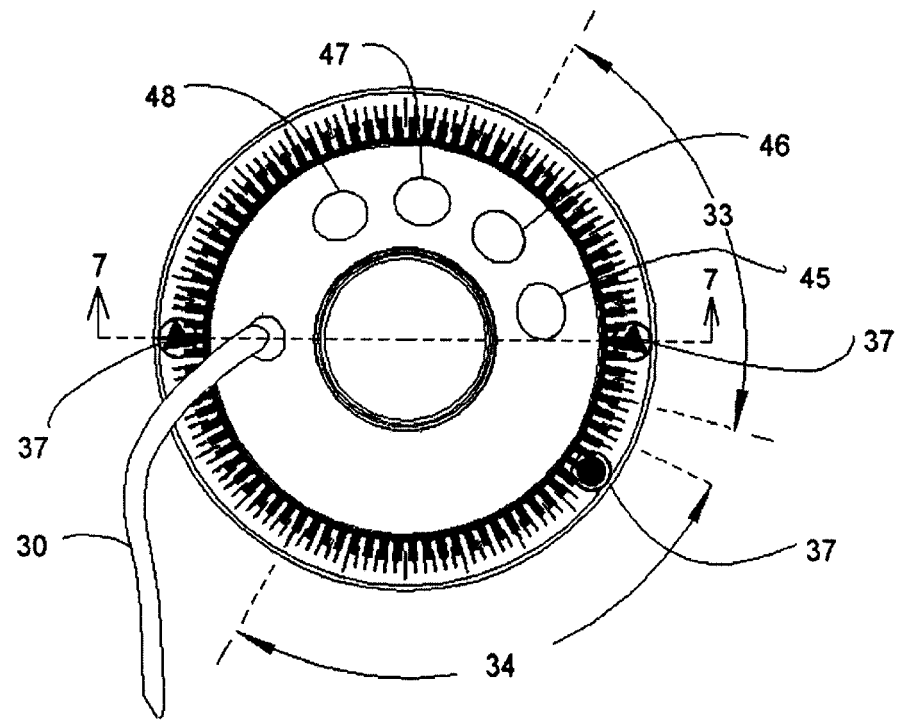
FIG. 5 is a plan view of the computer mouse.
Figure 10:
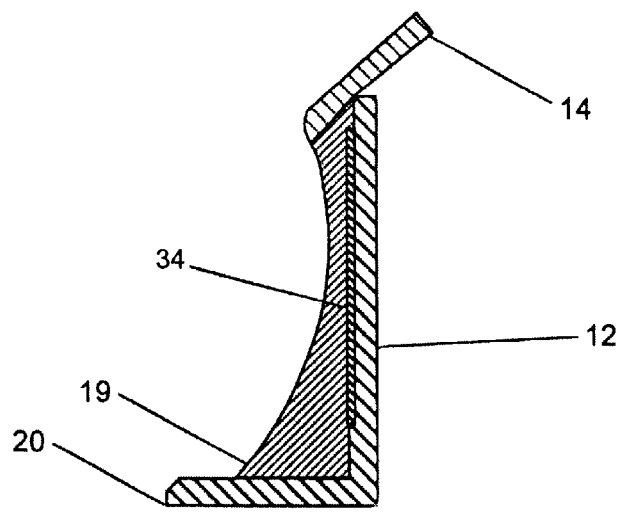
FIG. 10 is a cross-sectional detailed elevation of the present invention.

The present mouse includes two membrane switches secured at the outer surface of the side wall 12 beneath the grip sleeve 19. Membrane switch 34 is shown in FIG. 10, and both switches 33 and 34 are shown in FIG. 5 as they extend throughout part of the circumference of the side wall 12. Each membrane switch extends about 80 degrees and in total they extend circumferentially for a combined angular increment of approximately 170 degrees such that a switch may be actuated from a grasp by two different fingers. A small gap is left between the front membrane switch 33 and the rear membrane switch 34 so that they can be separately actuated without confusion.

The natural grasp of the fingers around the grip allow for these two switch positions or zones, and the switches 33 and 34 are identified to the user from clearly marked icons 37 on the skirt 20. As may be seen from FIG. 5, the two switch zones comprise radial sections around the grip where fingertip pressure results in switch actuation. The wide angle of actuation is intended to allow button actuation from almost any grasp posture. The primary switch 33 is operable by pressure of the grasp itself, and a secondary rear switch 34 in the grip may be operable by the ring or little finger. Thus the most frequently used switch is designed to lie directly within the grasp where it may be actuated by a simple "squeeze" action. The squeezing action is easily learned and does not inhibit mouse motion.

The software used with the mouse includes a feature allowing the user to assign functions of the computer to various buttons. In the preferred embodiment, for a right-handed user the software assigns the main (most used) computer functions to the right-most button 45 However, the user can assign this function to another button or switch if desired.

The preferred embodiment features a polyester film membrane switch assembly that is wrapped around the vertical side wall of the housing structure under the tactile rubber grip 19 as shown in FIG. 10. There are a variety or other methods that might also accomplish the placement of membrane or other type switches along the side wall to the same effect. They might be flush or covered by a thin tactically conductive grip or rubber, polymer, plastic, or the like.

In the preferred embodiment of this invention, the switches 45–48 are of a transparent polycarbonate material. Two light emitting diodes 41 and 41a for emitting light in the visible range are mounted on the upper of two circuit boards 40 within the top panel 14 and the light so emitted shines through the transparent switch actuator balls 38 to provide strong and salient visual cues to the user. Two LEDs with an illumination intensity of 1000 MCD or more in the visual light range are more than sufficient to produce bright backlighting of the switches 45–48. The bank of transparent switch actuators 45–48 is illuminated together as a group for maximum visual effect.

This embodiment utilizes the user's peripheral apprehension of the switch backlighting to communicate computer information to the user as well as provide an enhanced visual esthetic. For example, in the present preferred embodiment the mouse processor chip 15 "blinks" the LED's 41 and 41*a* when any of the switches 45–48 or 33 or 34 are activated, to provide visual feedback in the absence of an audible cue. As another example, the LED's blink, as discussed further below, when the computer is in "scroll mode". Scrolling is a page viewing function that when implemented causes the "page" on the computer screen to move either up or down, relative to the monitor "window". Long documents may be accessed this way analogous to the mechanics of a physical scroll of paper. In the prior art, the mechanics of implementing this scroll mode have been accomplished by the mouse, either through normal mouse buttons and movement or by a physical scroll wheel mounted on the mouse body. In the case of the scroll wheel, the wheel is depressed and rotated, and the movement of the wheel is translated to the movement of the page. Mice without a physical wheel implement the function by either; 1) depressing a button assigned to either scroll up (Mwheelup) or scroll down (Mwheeldown), or 2) depressing a button to engage scroll mode while moving the mouse back and forth across the desktop and translating the movement to the page display. Since this function is typically engaged by users for durations in the order of multiple seconds, it is useful to signal the function with a visual cue which conveys consistent information over the duration, and the flashing light patterns of the present embodiment are effective for this.

Figure 12:
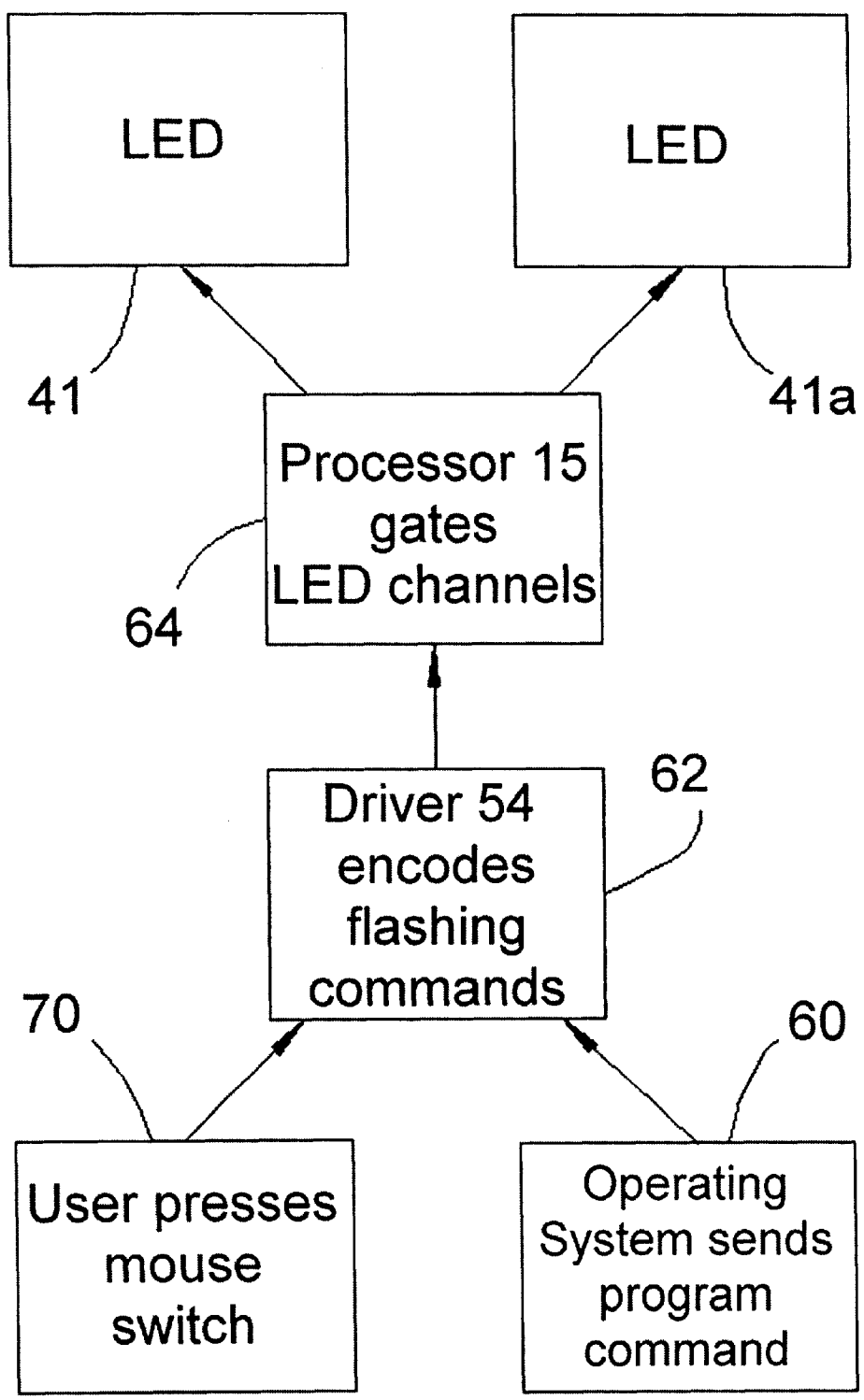
FIG. 12 is a flow chart illustrating the visual indicator features.

With reference to FIG. 12, a software driver 54 also allows the user to configure the blinking patterns for the scroll mode and other modes of computer status and operation. The information so communicated could be "the program is in delete mode" or "you have mail" or "your team has lost the flag", or virtually any other appropriate program information that can be communicated by the flashing lights. FIG. 12 shows a system signal flow diagram that allows computer programs comprising the computer's operating system to access the mouse backlighting to display cues about the specific program information. The conventional computer operating system 56 can be, for example, Microsoft Windows which maintains information about the status of various parameters of the computer such as whether the computer is in scroll mode. The driver 54 which is part of the present embodiment receives information from the operating system 56 and the driver 54 sends signals depending upon how the user has configured the driver. In the present example the user has configured the driver 54 to provide flashing commands whenever the computer is in scroll mode. Thus in step 60 the operating system 56 sends a signal to the driver 54 indicating that the computer is in scroll mode; in step 62 the driver encodes the appropriate flashing commands which have been selected by the user and sends signals instructing the processor 15 to accomplish step 64 in which the processor gates the LED's appropriately. Similarly, it can be seen that in step 70 the user presses a mouse switch 32 or 45–48 which causes a signal to be sent to the driver. The driver then encodes a signal according to step 62 which in turn causes the processor 15 to gate the appropriate LED channels thereby causing either or both of the LED's 41 and 41*a* to blink in the appropriate sequence.

In the present embodiment, processor chip 15 is mounted on the upper of the circuit boards 40 and contains programming instructions to produce a set of 4 patterns of flashing light which are varied in terms of flashing rate and color of light, these combinations having been determined by testing to be easily distinguishable. The chip 15 can cause the two LED's 41 and 41*a* to flash together or separately. If LED 41 produces a different spectrum of light than LED 41*a* multicolored flashing patterns can be provided. It is likely that there is a great variation in distinguishable flashing patterns based upon user preferences. For instance I found that backlighting flashing at a heartbeat rate (approximately 60 hz) is easily distinguishable from a faster 100 hz "alarm" rate. Since little color processing takes place in peripheral vision, (Bennett, P. J. & Banks, M. S. (1991) "The effects of contrast, spatial scale, and orientation on foveal and peripheral phase discrimination. Vision Research", 31, 1759–1786.) my testing of the backlighting with users found that the frequency of the flashing rate was more effectively distinguished than the color of the flashing lights.

In the present preferred embodiment I have found the following four flashing patterns to be effective to indicate such computer states as scroll mode; however, the software allows a user to program other patterns.

1. Flashing State No 1: (Slow alternate) Lights mimic human heart beat at rest, 2 quick pulses and a rest, repeated approx. once per second for a rep rate of approx. 60 cpm (cycles per minute). One color channel is inverted so that while it is off, the other is on, etc. This yields a heart beat pattern which alternates in 2 colors.
2. Flashing State No 2: (Slow blend) Lights mimic human heart beat at rest, 2 quick pulses and a rest, as one above. Both color channels flash together yielding a heart beat pattern in a color blended from the 2 color channels.
3. Flashing State No 3: (Fast Alternate) Lights toggle on/off every 250 milliseconds for a flashing rate of approx. 120 cpm. This flash rate is distinguishable, and familiar to most users as it is approximately the frequency of flashing indicators used on various consumer devices (burglar and car alarms, timers, etc) to indicate an "alarm" state. One color channel is inverted so that while it is off, the other is on, etc, yielding a flashing signal that alternates in color.
4. Flashing State No 4: Fast Blend) Lights toggle on/off every 250 milliseconds for a flashing rate of approx. 120 cpm as in 3 above. Both color channels flash together yielding an "alarm" rate flashing pattern in a color blended from the 2 color channels.

To indicate when a button or switch is actuated, the lights, if on, are toggled off for 50 milliseconds. If off, they are toggled on for the same duration.

If a user programs the flashing patterns an important consideration is to have a small number of flashing patterns (3–5) that the user can tell apart (distinguish) in the same session. Otherwise it is impossible to justify a particular light pattern as preferred. A user may also configure the mouse with a background flashing pattern (1–4 above) that flashes continually, and is interrupted by the button blink and other flashing modes accompanying button presses. Or the user can opt to keep the lights illuminated but not flashing, or unlighted.

Since the computer operator may be assumed to be visually focused on the computer monitor for most tasks, the backlighting in the mouse occurs within the periphery of the visual system and is processed by the peripheral visual system, which operates independently of foveal (attentive) vision. "The advantage of using peripheral vision to supplement normal heads-up displays is that the extra information doesn't require any extra attention. Peripheral vision provides cues that impart information without the (pilot) having to think about it." University of Idaho research psychologist Brian Dyre ("Heads-up displays get peripheral vision" R. Colin Johnson, EE Times [Nov. 09, 1998, 3:54 p.m. EST] http:H/www.eetimes.com/story/OEG19981109S0021) The peripheral visual system is a highly evolved light detection system that detects movement or changes in light instantly and continually without any requirement for attention. (Banks, M. S., Sekuler, A. B., & Anderson, S. J. (1991) Peripheral spatial vision: Limits imposed by optics, photoreceptors, and receptor pooling. Journal of the Optical Society of America A,8, 1775–1787.) Thus the invention allows the communication of additional computer information to the user through flashing light signals displayed by the mouse which are perceived and processed by the independent peripheral visual system without requiring the user to divert attention from the computer monitor.

While the top mounted switches 45–48 of the preferred embodiment form a usable light emanation source, it should be understood that the present flashing light system is not limited to use with the present embodiment. In fact, a mouse of conventional form could use a transparent shell or transparent panels with interior LED lighting to the same effect.

To augment the membrane switch lack of a an audible "click" cue, the present invention includes software and processor programming which allows the coupling of sounds generated by the computer sound system to the mouse button operation such that immediate aural feedback is provided to the user. The programmable sounds (chimes, clicks, etc) increase the operator's control and general attention to the mouse tasks. This feature is available in the prior art in Macintosh® operating system software and the like.

Experience with the present mouse design shows that the membrane switches 33 and 34 may be actuated quite independently from the top switches 45–48, and that they may easily be actuated in combination. In the present preferred embodiment, software programming supplements this mechanical redundancy by identifying at the processor and with software when grip and top buttons are pressed simultaneously, and translating these concurrent events into additional discrete mouse events. The flexibility of this ergo driven combination switch processing is that it allows increased control event generation without additional movement or switches. In another embodiment of the present invention, processor chip and software programming make personalized ergonomic button assignments by allowing computer mouse functions to be assigned to preferred mouse button locations, or even simultaneous locations. For instance "Left Mouse Button" may be located both in the grip and on the top panel. This embodiment allows the ergonomic advantage of being able to flexibly switch the control actuating tasks between two separate muscle groups to counter fatigue.

Figure 8:
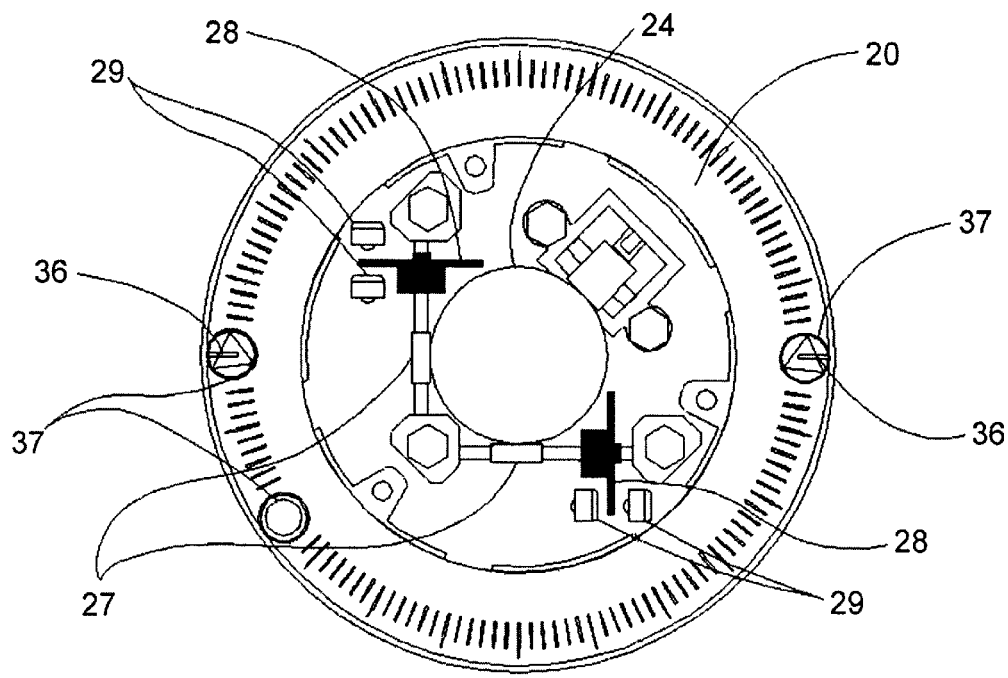
FIG. 8 is a bottom interior view of the computer mouse with the base removed.
Figure 9:
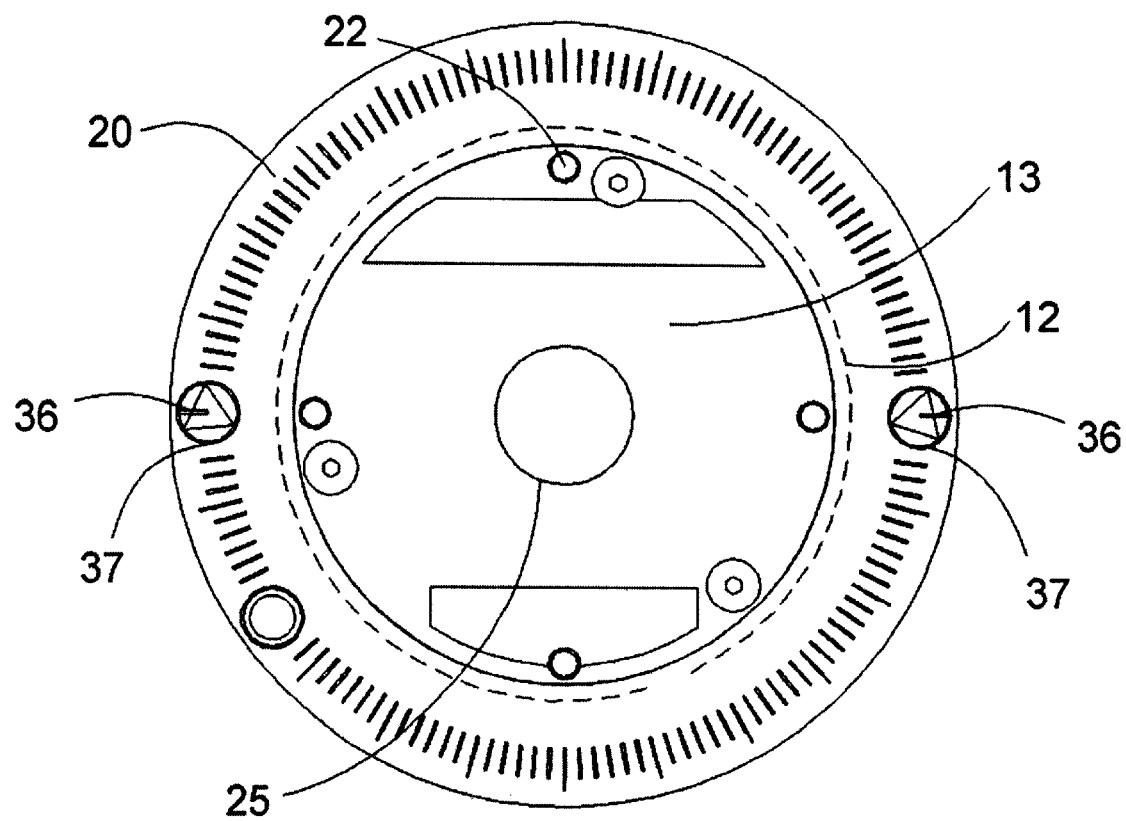
FIG. 9 is a bottom view of the computer mouse.

It should be understood that the present mouse is operable by the fingers alone. As discussed above, normally the user can operate the mouse by moving only his fingers and thumb while resting the side of his little finger and the blade of his hand on the fixed surface and keeping the little finger and blade of the hand stationary on the fixed surface. To accomplish this I have found that it is important that the mouse provide for very sensitive cursor placement with minimal travel of the mouse. Accordingly the mouse is designed to allow the user to send the cursor from corner to corner of the computer screen with only about ¾" of mouse travel on the desktop. With reference to FIGS. 7 and 8, within the closed housing formed by the base 13, side wall 12, and top panel 14, there is disposed a mouse tracking mechanism for generating an electronic signal corresponding to movement of the mouse in the X-Y plane on a mouse-supporting surface. This aspect of the present mouse is conventional and therefore will not be discussed in detail herein. The present embodiment includes a solid ball 24 disposed within the mouse structure and depending through an axial opening 25 in the base 13. The ball impinges on the surface that supports the mouse structure, and rolls along the supporting surface as the user moves the mouse. Two axles 27 extend horizontally and in mutually perpendicular relationship to each other, each axle 27 supporting an encoder mask wheel 28 that is engaged at a peripheral portion by an optical sensor 29. Each optical sensor detects rotation of the respective wheel 28, which is caused by impingement and rotation of the ball 24. The sensors 29 thus generate X-Y coordinate translation signals, which are conducted through a cable 30 to the computer. Other mouse tracking mechanisms such as those of the conventional optical type may be used with equal efficacy in this invention. As is known in the prior art, any such tracking mechanism may be assembled on a common printed circuit board that is mounted within the mouse 11.

The present mouse further includes a function which may be assigned to any of the switches (33, 34, 45–48), the effect of which is to uncouple the mouse movement from the cursor positioning task while depressed. This function, herein termed a clutch switch, simply allows the operator to move the mouse on the desk while the clutch switch is actuated without moving the cursor on the screen.

Figure 11:
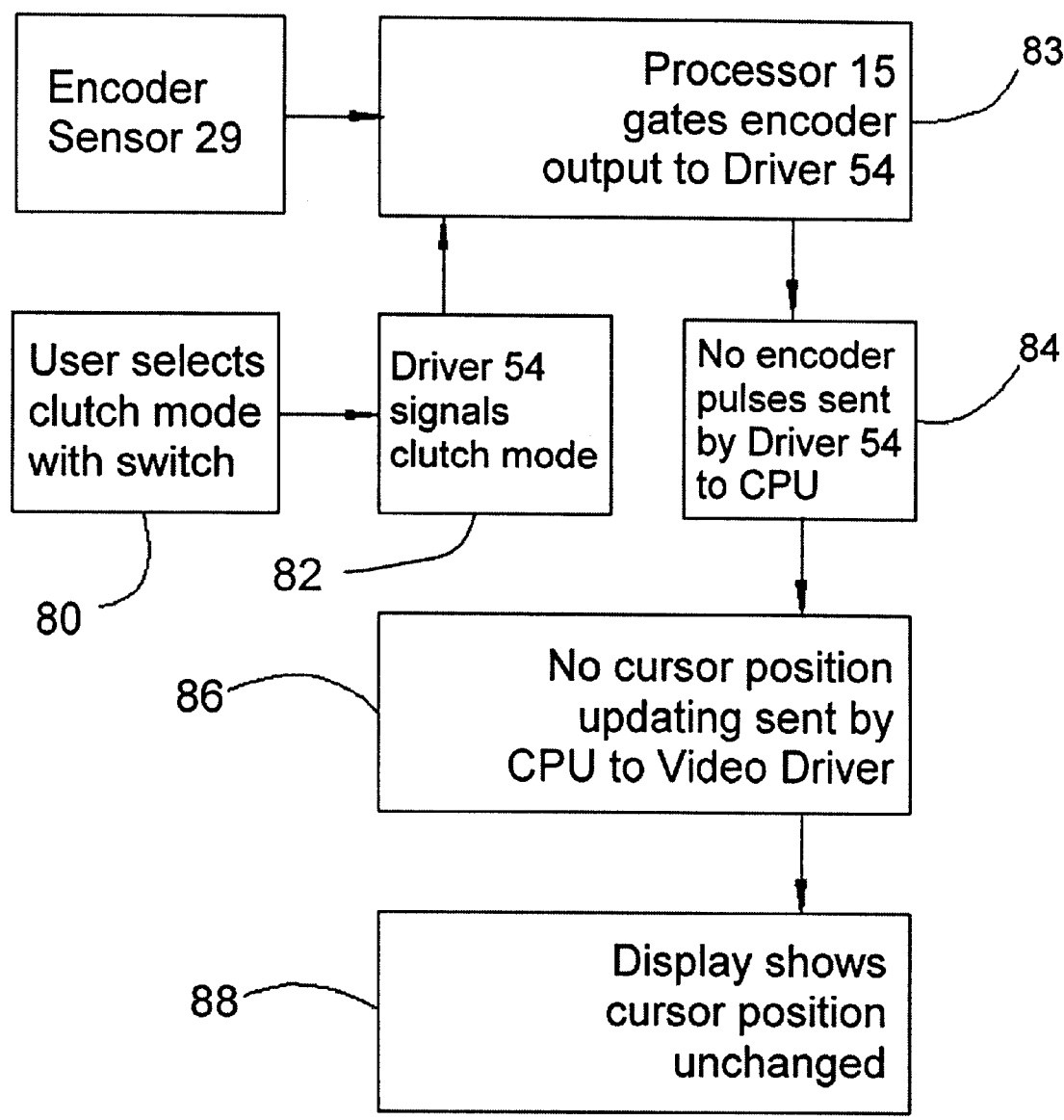
FIG. 11 is a flow chart illustrating the clutch mode.

With reference to FIG. 11, in step 80 the user selects the clutch mode by actuating switch 32, 33 or 45–48 (whichever has been pre-selected to be the clutch switch). This user operation sends an instruction to driver 54 which sends an appropriate signal to processor 15 according to step 82. Then according to step 83 this causes the processor 15 to gate the output of encoder sensors 29 which are received by the processor. Accordingly, in step 84 no encoder pulses are sent to the computer CPU and the CPU does not process any updating of the cursor position or send position updating to the video driver as shown in step 86. Thus the computer display shows the cursor position unchanged regardless of any movement of the mouse, according to step 88.

The ergonomic advantage of the clutch switch is to allow the operator to move the mouse back to the locus of the most comfortable postural position without losing or affecting the cursor position. By allowing the user to return the mouse to this zone or "sweet spot" on the desktop, the user is able to operate the mouse with greatest efficiency and least movement and effort. It is noted that virtually all mouse users have a preferable home position or "sweet spot" where they are most comfortable, and they seek to regain or maintain this position more or less naturally. However, it is inevitable that the mouse tasks will take the mouse out of the zone. Some users even adopt a strategy of lifting the mouse from the desktop ("pawing") to return it without consequent loss of cursor position, though this action requires a learned skill. The clutch function makes this "homing" strategy available at the touch of a button, and obviates the pawing maneuver.

Although the preferred embodiments of the present invention are described above, it should be understood that the invention is not limited to the described embodiments but is encompassed by the claims which follow.

I claim:

1. A computer and computer mouse system comprising:

a base;

a circular side wall coupled to said base and extending substantially vertically from said base with a concave curvature in elevation view;

a generally flat top panel attached to said side wall;

first switch means coupled to said top panel for receiving user inputs from one of the fingers of the computer user and generating switch signals, said first switch means comprising four switches;

second switch means coupled to said side wall for receiving user inputs from the computer user and generating switch signals;

mouse tracking means coupled to said base for generating mouse movement signals which cause movement of a cursor on the computer screen while the user moves the mouse on a fixed surface;

clutch switch means coupled to said side wall to enable the user to move the mouse on the fixed surface without moving the cursor on the computer display, said clutch switch means including a momentary actuation switch that is disposed to be actuated while the user grips and moves the mouse on the surface;

light indicator means coupled to the mouse for providing light which is visible to a computer user;

software means in the computer for causing the light indicator means to indicate to the computer user predetermined modes of computer activity and operation;

wherein said software means causes the light indicator means to flash in a pattern which is representative of a respective one of a plurality of computer activities or operations.

2. A computer and mouse system according to claim 1 wherein the computer user can configure said software means to cause the light indicator means to flash in a predetermined pattern according to the activity of the computer.

3. A computer and mouse system according to claim 1 wherein said software means causes the light indicator means to flash in a predetermined pattern when the computer is in scroll mode.

4. A computer and mouse system according to claim 1 wherein said software means causes the light indicator means to flash in a predetermined pattern when the user actuates a switch coupled to the mouse.

* * * * *